(12) United States Patent
Tomiyama et al.

(10) Patent No.: US 12,384,307 B2
(45) Date of Patent: Aug. 12, 2025

(54) SOUND-ABSORBING COVER

(71) Applicants: Sumitomo Riko Company Limited, Aichi (JP); TOKAI CHEMICAL INDUSTRIES, LTD., Gifu (JP)

(72) Inventors: Koji Tomiyama, Aichi (JP); Kazuyoshi Onishi, Aichi (JP); Yuhei Adachi, Aichi (JP); Kazuto Tanaka, Aichi (JP); Yasuo Suzuki, Gifu (JP); Hiroki Taguchi, Gifu (JP)

(73) Assignees: Sumitomo Riko Company Limited, Aichi (JP); TOKAI CHEMICAL INDUSTRIES, LTD., Gifu (JP)

( * ) Notice: Subject to any disclaimer, the term of this patent is extended or adjusted under 35 U.S.C. 154(b) by 328 days.

(21) Appl. No.: 17/961,570

(22) Filed: Oct. 7, 2022

(65) Prior Publication Data

US 2023/0034180 A1 Feb. 2, 2023

Related U.S. Application Data

(63) Continuation of application No. PCT/JP2021/016369, filed on Apr. 22, 2021.

(30) Foreign Application Priority Data

Apr. 23, 2020 (JP) .................................. 2020-076405

(51) Int. Cl.
*B32B 7/022* (2019.01)
*B32B 3/06* (2006.01)
(Continued)

(52) U.S. Cl.
CPC ............ *B60R 13/0838* (2013.01); *B32B 3/06* (2013.01); *B32B 3/30* (2013.01); *B32B 5/18* (2013.01);
(Continued)

(58) Field of Classification Search
CPC .... B32B 3/06; B32B 3/30; B32B 5/18; B32B 5/32; B32B 7/022; B32B 2266/0278;
(Continued)

(56) References Cited

U.S. PATENT DOCUMENTS 5,744,763 A * 4/1998 Iwasa .................. G10K 11/165
181/290
6,382,350 B1 * 5/2002 Jezewski ................. B32B 38/04
181/290
(Continued)

FOREIGN PATENT DOCUMENTS

JP 2005213420 8/2005
JP 2007255189 10/2007
(Continued)

OTHER PUBLICATIONS

"Written Opinion of the International Searching Authority (Form PCT/ISA/237) of PCT/ JP2021/016369," mailed on Jul. 6, 2021, with English translation thereof, pp. 1-9.
(Continued)

*Primary Examiner* — Forrest M Phillips
*Assistant Examiner* — Joseph James Peter Illicete
(74) *Attorney, Agent, or Firm* — JCIPRNET

(57) ABSTRACT

A sound-absorbing cover comprises a first sound-absorbing layer and a second sound-absorbing layer made of foam, a first skin layer of the first sound-absorbing layer and a second skin layer of the second sound-absorbing layer are layered in a state of being made to face each other, and an air layer is provided between the facing surfaces of the first skin layer and the second skin layer. The rigidity of the first skin layer of the first sound-absorbing layer is different from the rigidity of the second skin layer of the second sound-absorbing layer.

19 Claims, 10 Drawing Sheets

(51) Int. Cl.
    *B32B 3/30*     (2006.01)
    *B32B 5/18*     (2006.01)
    *B32B 5/32*     (2006.01)
    *B60R 13/08*     (2006.01)
    *G10K 11/168*     (2006.01)

(52) U.S. Cl.
    CPC ............... *B32B 5/32* (2013.01); *B32B 7/022* (2019.01); *G10K 11/168* (2013.01); *B32B 2266/0278* (2013.01); *B32B 2307/102* (2013.01); *B32B 2307/536* (2013.01); *B32B 2307/72* (2013.01); *B32B 2307/724* (2013.01); *B32B 2605/00* (2013.01)

(58) Field of Classification Search
    CPC ........ B32B 2307/102; B32B 2307/536; B32B 2307/72; B32B 2307/724; B32B 2605/00; G10K 11/168; B60R 13/083; B60R 13/08; B60R 13/0838; B60R 13/0815; B29C 43/203; B29K 2105/045; B29K 2105/043
    See application file for complete search history.

(56) References Cited

U.S. PATENT DOCUMENTS

| | | | |
|---|---|---|---|
| 9,615,670 B2* | 4/2017 | Takaoka | B32B 5/18 |
| 10,851,897 B2* | 12/2020 | Robinson | B32B 5/18 |
| 11,904,557 B2* | 2/2024 | Albertelli | B32B 7/12 |
| 11,912,009 B2* | 2/2024 | Yamanaka | B32B 5/022 |
| 2019/0291661 A1* | 9/2019 | Byung-Jong | B32B 5/028 |

FOREIGN PATENT DOCUMENTS

| | | |
|---|---|---|
| JP | 2008096637 | 4/2008 |
| JP | 2009227227 | 10/2009 |
| JP | 2010184655 | 8/2010 |
| JP | 2012166717 | 9/2012 |
| JP | 2013147939 | 8/2013 |

OTHER PUBLICATIONS

"International Search Report (Form PCT/ISA/210) of PCT/JP2021/016369", mailed on Jul. 6, 2021, with English translation thereof, pp. 1-4.
"Office Action of China Counterpart Application", with English translation thereof, issued on Mar. 22, 2025, pp. 1-20.

* cited by examiner

SOUND-ABSORBING COVER

CROSS-REFERENCE TO RELATED APPLICATION

The present application is a continuation of PCT/JP2021/016369, filed on Apr. 22, 2021, and is related to and claims priority from Japanese patent application no. 2020-076405, filed on Apr. 23, 2020. The entire contents of the aforementioned application are hereby incorporated by reference herein.

TECHNICAL FIELD

The disclosure relates to a sound-absorbing cover disposed in a noise source such as a vehicle.

RELATED ART

In vehicles such as automobiles, sound-absorbing covers are disposed around the noise sources for the purpose of reducing noise generated from noise sources such as engines, motors, intake manifolds, and electric compressors.

Of these, as an automobile engine cover, an engine cover made of polyurethane foam has been conventionally used as exemplified in Patent Literature 1. In recent years, the frequency band of noise to be sound-absorbed has expanded, and in particular, a sound-absorbing cover that absorbs low-frequency noise of 1 kHz or less is required.

Therefore, Patent Literature 2 discloses a layered sound-absorbing material that may effectively absorb noise in a frequency band of less than 1 kHz by forming a layered structure including a high air-permeable layer made of a porous body having an air permeability of 5 ml/cm2/s or more, and a low air-permeable layer made of polyurethane foam having an air permeability of more than 0.05 ml/cm$^2$/s and 2 ml/cm$^2$/s or less.

Further, Patent Literature 3 discloses an engine cover that includes a urethane foam resin layer, a PET non-woven fabric layer, and an air layer between them, and has a sound-absorbing effect even in a low frequency band of 500 to 1000 Hz.

CITATION LIST

Patent Literature

[Patent Literature 1] Japanese Patent Application Laid-Open No. 2013-147939
[Patent Literature 2] Japanese Patent Application Laid-Open No. 2010-184655
[Patent Literature 3] Japanese Patent Application Laid-Open No. 2007-255189

SUMMARY

Technical Problem

The layered sound-absorbing material described in Patent Literature 2 discloses a method of layering a low air-permeable layer and a high air-permeable layer by fixing them with an adhesive or the like, and a method of simply layering a low air-permeable layer and a high air-permeable layer. When the low air-permeable layer and the high air-permeable layer are fixed with an adhesive or the like, the adhesive layer may hinder the air permeability and reduce the sound-absorbing effect. Further, when the low air-permeable layer and the high air-permeable layer are layered in layers, the air permeability is not hindered in the layered region of the low air-permeable layer and the high air-permeable layer; however, since the sound absorption performance on the low frequency side depends on the performance of the low air-permeable layer, there is room for improvement in the sound absorption performance on the low frequency side.

Further, the engine cover described in Patent Literature 3 has a large difference in sound absorption effect between the band of 800 to 1800 Hz and the band of 800 Hz or less, and there is room for improvement in improving the sound absorption performance on the low frequency side.

The disclosure has been made in view of such circumstances, and the disclosure provides a sound-absorbing cover capable of effectively absorbing noise on the low frequency side in a wider range.

Solution to Problem

The inventors pay attention to the layered region of the two sound-absorbing layers, and it was found that by setting the configuration and properties of the layered region of the two sound-absorbing layers in a specific range, the noise on the low frequency side may be effectively absorbed in a wider range, and the disclosure was completed.

In view of the above, a sound-absorbing cover according to the disclosure includes: (1) a first sound-absorbing layer having a first foam layer and a first skin layer integrally molded when the first foam layer is molded; and a second sound-absorbing layer having a second foam layer and a second skin layer integrally molded when the second foam layer is molded, and (2) the first skin layer of the first sound-absorbing layer has a rigidity different from a rigidity of the second skin layer of the second sound-absorbing layer, and (3) the first sound-absorbing layer and the second sound-absorbing layer are layered in a state where the first skin layer and the second skin layer face each other, and the sound-absorbing cover further comprises an air layer between facing surfaces of the first skin layer and the second skin layer.

According to the sound-absorbing cover of the disclosure, noise on the low frequency side may be effectively absorbed in a wider range.

DESCRIPTION OF THE EMBODIMENTS

<1. Application Example of Sound-Absorbing Cover>

The sound-absorbing cover of the disclosure is applied to a sound-absorbing cover that covers a noise source such as an automobile engine, a motor, an intake manifold, and an electric compressor, and absorbs noise generated from the noise source. In particular, it is suitably applied to a noise source that generates low frequency noise. These sound-absorbing covers generally have a bottomed recessed shape that opens to the noise source side, and are fixed to a fastening member such as a bolt on the noise source side.

<2. Configuration of Sound-Absorbing Cover>

The sound-absorbing cover has a structure in which two foam sound-absorbing layers including skin layers are layered, and the skin layers are layered so as to face each other. One sound-absorbing layer is disposed on the noise source side, and the other sound-absorbing layer is disposed on the non-noise source side, which is used as a design surface. The sound-absorbing cover includes an air layer between the skin layers that are layered facing each other.

First Embodiment

Figure 1:
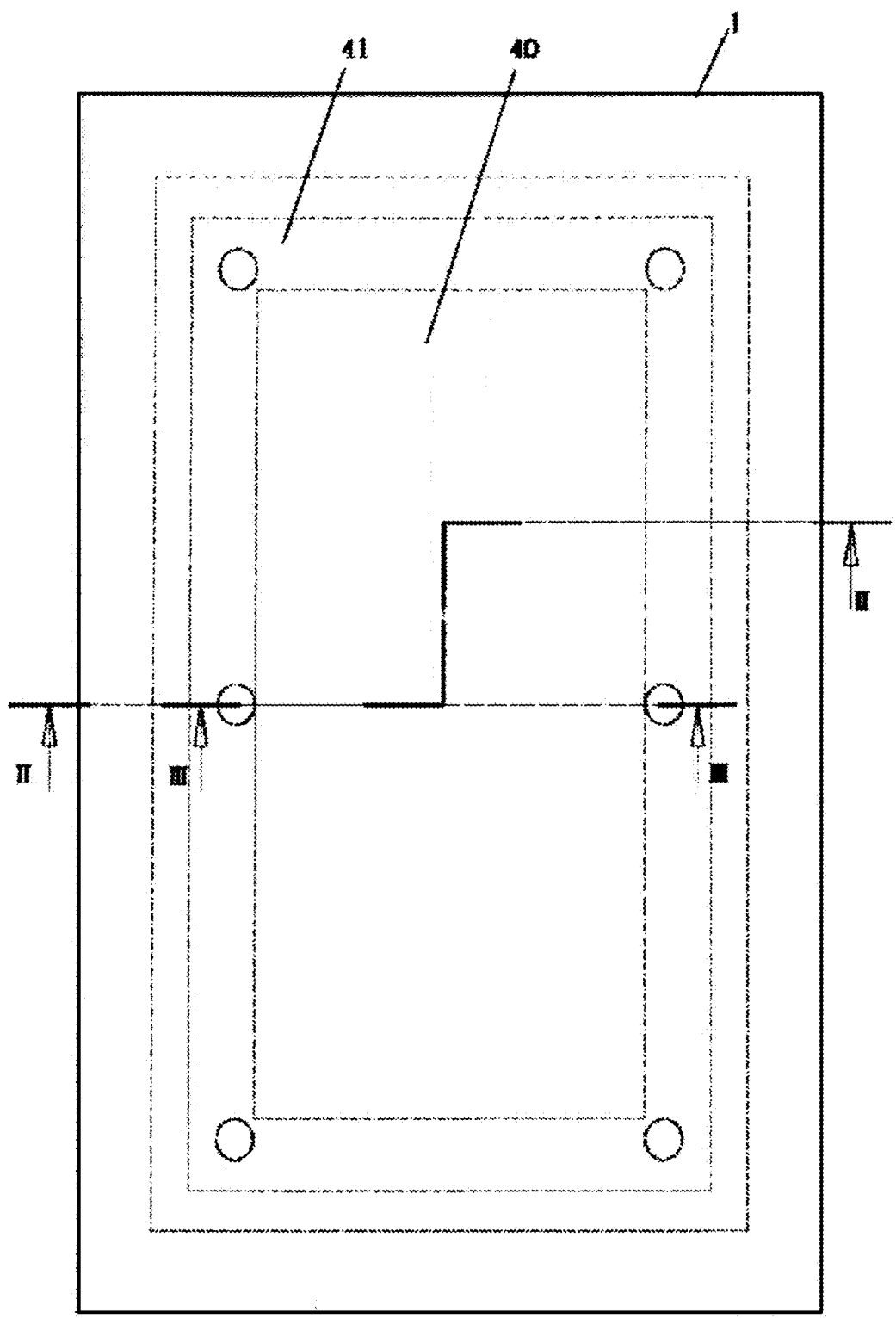
FIG. 1 is a plan view of a sound-absorbing cover according to a first embodiment of the disclosure.
Figure 2:
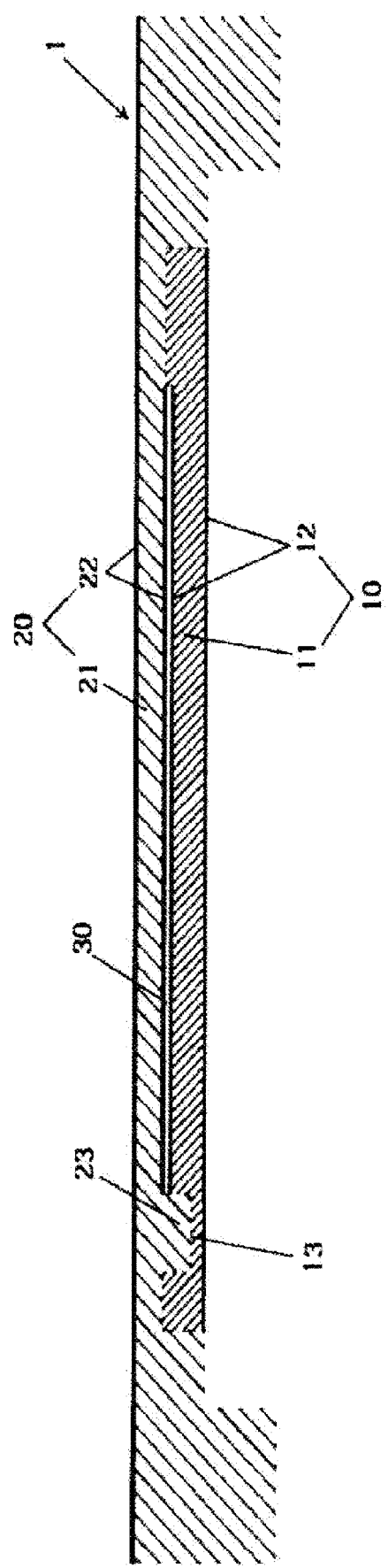
FIG. 2 is a cross-sectional view taken along the line II-II of FIG. 1.

The configuration of a sound-absorbing cover 1 according to a first embodiment of the disclosure will be described with reference to FIGS. 1 to 3. As shown in FIGS. 1 and 2, the sound-absorbing cover 1 has a bottomed recessed shape that opens to the noise source side (not shown). The sound-absorbing cover 1 is formed into any shape according to the outer shape of the target noise source.

In this embodiment, the cover body having a bottomed recessed shape that opens to the noise source side is formed by the second sound-absorbing layer 20, and the first sound-absorbing layer 10 is disposed in the region of the recess facing the noise source.

Figure 3:
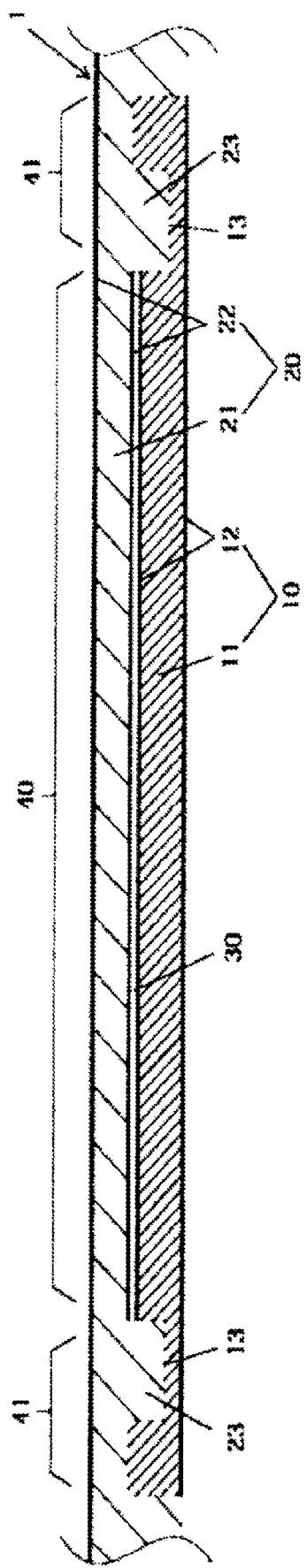
FIG. 3 is a cross-sectional view taken along the line III-III of FIG. 1.

As shown in FIG. 3, the first sound-absorbing layer 10 and the second sound-absorbing layer 20 are layered in a region facing the noise source. The first sound-absorbing layer 10 is a foam sound-absorbing layer having a first foam layer 11 and a first skin layer 12 integrally molded when the first foam layer 11 is molded. In this embodiment, the first skin layers 12 and 12 are provided on both sides in the layering direction, but a configuration having the first skin layer 12 only on the side facing the second sound-absorbing layer 20 may also be adopted.

The second sound-absorbing layer 20 is a foam sound-absorbing layer having a second foam layer 21 and a second skin layer 22 integrally molded when the second foam layer 21 is molded. In this embodiment, the second skin layers 22 and 22 are provided on both sides in the layering direction, but a configuration having the second skin layer 22 only on the side facing the first sound-absorbing layer 10 may also be adopted.

As shown in FIGS. 2 and 3, the first skin layer 12 of the first sound-absorbing layer 10 and the second skin layer 22 of the second sound-absorbing layer 20 are layered so as to face each other, and an air layer 30 is provided between the facing surfaces of the first skin layer 12 and the second skin layer 22.

As shown in FIGS. 1 and 3, in the plane direction of the surface layer in which the first skin layer 12 is formed, the first sound-absorbing layer 10 has a first region 40 in which the first skin layer 12 is formed and a second region 41 surrounding the first region 40. In this embodiment, the first region 41 is set to have a rectangular shape in a plan view. The first region 40 may be set to any shape according to the shape of the sound-absorbing target that is a noise source.

As shown in FIG. 3, in the cross-sectional view of the first sound-absorbing layer 10 in the thickness direction, the upper surface of the second region 41 of the first sound-absorbing layer 10 is disposed closer to the second sound-absorbing layer 20 side than the upper surface of the first region 40. In other words, the first region 40 is a recessed region formed inside the second region 41, and the first region 40 is disposed below the first region 41.

Further, as shown in FIG. 1, six first engaging recesses 13 are formed in the first region 40 of the first sound-absorbing layer 10 at intervals in the circumferential direction. In this embodiment, the first engaging recess 13 is a recess having a circular shape in a plan view, which is connected to the outer edge of the first region 40 and is recessed in the thickness direction of the first sound-absorbing layer 10.

The first engaging recess 13 may have any shape, such as a rectangular recess in a plan view. Further, in the cross-sectional view of the first sound-absorbing layer 10 in the thickness direction, it may be a recess having a step or an inclination.

Further, the first engaging recess 13 may be an annular recess continuous in the circumferential direction so as to surround the entire circumference of the first region 40, and may be set to any shape according to the shape of the first region 40.

As shown in FIGS. 2 and 3, the second sound-absorbing layer 20 has six first engaging protrusions 23 protruding toward the first sound-absorbing layer 10 at predetermined intervals in a region (second region 41) surrounding the second skin layer 22 disposed to face the first skin layer 12 of the first sound-absorbing layer 10.

The first engaging protrusion 23 is formed at a position facing the first engaging recess 13 of the first sound-absorbing layer 10 disposed to face each other, and in this embodiment, the first engaging protrusion 23 is a protrusion having a circular shape (cylindrical shape) in a plan view. Further, the outer diameter of the first engaging protrusion 23 is set to be slightly larger than the inner diameter of the first engaging recess 13 of the first sound-absorbing layer 10.

When the first sound-absorbing layer 10 is provided with an annular first engaging recess, the first engaging protrusion may be set to any shape according to the shape of the first engaging recess, such as an annular protrusion corresponding to the first engaging recess.

The air layer 30 is formed by integrating the first sound-absorbing layer 10 and the second sound-absorbing layer 20. Specifically, when the first engaging recess 13 of the first sound-absorbing layer 10 is engaged with the first engaging protrusion 23 of the second sound-absorbing layer 20, since the thickness of the first region 40 of the first sound-absorbing layer 10 is smaller than the thickness of the second region 41, as shown in FIG. 3, a gap is formed between the facing surfaces of the first skin layer 12 of the first sound-absorbing layer 10 and the second skin layer 22 of the second sound-absorbing layer 20, and this gap serves as the air layer 30.

In this embodiment, as will be described later, the hardness of the second sound-absorbing layer 20 is made larger than the hardness of the first sound-absorbing layer 10, and the outer diameter of the first engaging protrusion 23 of the second sound-absorbing layer 20 is slightly larger than the inner diameter of the first engaging recess 13 of the first sound-absorbing layer 10; therefore, the deformation of the first engaging protrusion 23 is suppressed and is press-fitted into the first engaging recess 13 of the first sound-absorbing layer 10 and engaged at the time of engagement, so the first sound-absorbing layer and the second sound-absorbing layer are integrated in a state that does not hinder handling.

In this embodiment, the first sound-absorbing layer 10 is provided with the first engaging recess 13 and the second sound-absorbing layer 20 is provided with the first engaging protrusion 23, but it may be configured that the first sound-absorbing layer 10 is provided with an engaging protrusion, and that the second sound-absorbing layer 20 is provided with an engaging recess. Further, the hardness of the second sound-absorbing layer 20 may be smaller than the hardness of the first sound-absorbing layer 10 as long as the handling is not hindered.

Second Embodiment

In the first embodiment, the first sound-absorbing layer 10 is provided with the first region 40 having a height difference in the thickness direction and the second region 41. In the second embodiment, the second sound-absorbing layer 20 is provided with a third region 50 having a height difference in the thickness direction and a fourth region 51.

The configuration of the sound-absorbing cover 1a of the second embodiment will be described with reference to FIG. 4. The same reference numerals as those of the first embodiment are used for the same components as those of the first embodiment.

In the plane direction, the second sound-absorbing layer 20 has a third region 50 in which the second skin layer 22 is formed to face the first skin layer 12 of the first sound-absorbing layer 10, and a fourth region 51 surrounding the third region 50. In this embodiment, the third region 50 is set to have a rectangular shape in a plan view. The third region 50 may be set to any shape according to the shape of the sound-absorbing target that is a noise source.

Figure 4:
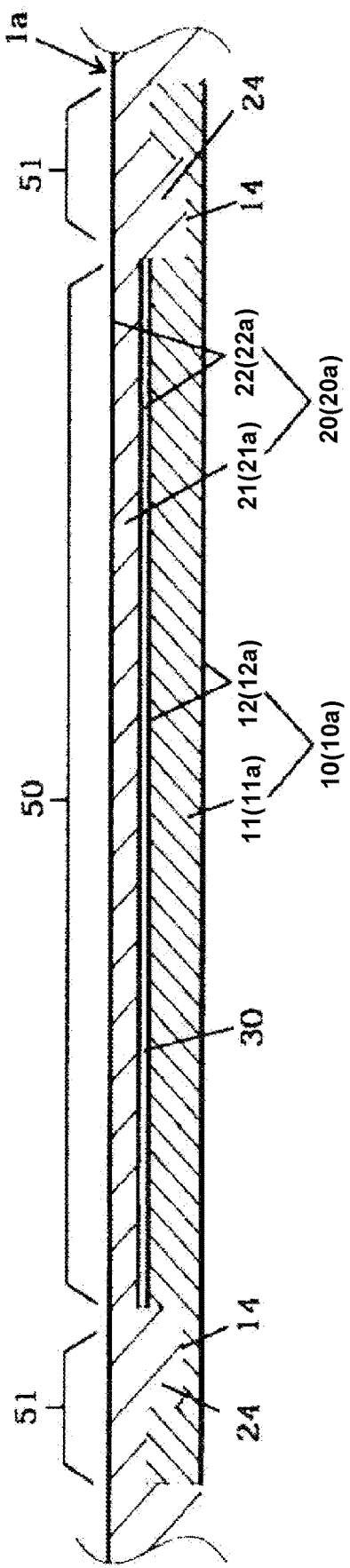
FIG. 4 is a partial cross-sectional view of a sound-absorbing cover according to a second embodiment of the disclosure.

As shown in FIG. 4, in the cross-sectional view of the second sound-absorbing layer 20 in the thickness direction, the lower surface of the fourth region 51 is disposed closer to the first sound-absorbing layer 10 side than the lower surface of the third region 50. In other words, the third region 50 is a recessed region formed inside the fourth region 51, and the third region 50 is disposed above the fourth region 51.

Further, as shown in FIGS. 1 and 4, six second engaging protrusions 24 are formed in the fourth region 51 of the second sound-absorbing layer 20 at intervals in the circumferential direction. In this embodiment, the second engaging protrusion 24 is a protrusion having a circular shape (cylindrical shape) in a plan view, which is connected to the outer edge of the third region 50 and protrudes in the thickness direction of the second sound-absorbing layer 20.

The second engaging protrusion 24 may have any shape, such as a rectangular protrusion in a plan view. Further, in the cross-sectional view of the second sound-absorbing layer 20 in the thickness direction, it may be a protrusion having a step or an inclination.

Further, the second engaging protrusion 24 may be an annular protrusion continuous in the circumferential direction so as to surround the entire circumference of the third region 50, and may be set to any shape according to the shape of the third region 50.

The first sound-absorbing layer 10 has six second engaging recesses 14 opening toward the second sound-absorbing layer 20 at predetermined intervals in a region (fourth region 51) surrounding the first skin layer 12 disposed to face the second skin layer 22 of the second sound-absorbing layer 20.

The second engaging recess 14 is formed at a position facing the second engaging protrusion 24 of the second sound-absorbing layer 20 disposed to face each other, and in this embodiment, the second engaging recess 14 is a recess having a circular shape in a plan view. Further, in this embodiment, the outer diameter of the second engaging recess 14 is slightly smaller than the inner diameter of the second engaging protrusion 24 of the second sound-absorbing layer 20.

When the second sound-absorbing layer 20 is provided with an annular second engaging protrusion, the second engaging recess may be set to any shape according to the shape of the second engaging protrusion, such as an annular recess corresponding to the second engaging protrusion.

The air layer 30 is formed by integrating the first sound-absorbing layer 10 and the second sound-absorbing layer 20. Specifically, when the second engaging recess 14 of the first sound-absorbing layer 10 is engaged with the second engaging protrusion 24 of the second sound-absorbing layer 20, since the thickness of the third region 50 of the second sound-absorbing layer 20 is smaller than the thickness of the fourth region 51, as shown in FIG. 4, a gap is formed between the facing surfaces of the first skin layer 12 of the first sound-absorbing layer 10 and the second skin layer 22 of the second sound-absorbing layer 20, and this gap serves as the air layer 30.

In this embodiment, as will be described later, the hardness of the second sound-absorbing layer 20 is made larger than the hardness of the first sound-absorbing layer 10, and the outer diameter of the second engaging protrusion 24 of the second sound-absorbing layer 20 is slightly larger than the inner diameter of the second engaging recess 14 of the first sound-absorbing layer 10; therefore, the deformation of the second engaging protrusion 24 is suppressed and is press-fitted into the second engaging recess 14 of the first sound-absorbing layer 10 and engaged at the time of engagement, so they are integrated in a state that does not hinder handling.

In the second embodiment, the first sound-absorbing layer 10 is provided with the second engaging recess 14 and the second sound-absorbing layer 20 is provided with the second engaging protrusion 24, but it may be configured that the first sound-absorbing layer 10 is provided with an engaging protrusion, and that the second sound-absorbing layer 20 is provided with an engaging recess. Further, the hardness of the second sound-absorbing layer 20 may be smaller than the hardness of the first sound-absorbing layer 10 as long as the handling is not hindered.

Third Embodiment

Figure 5:
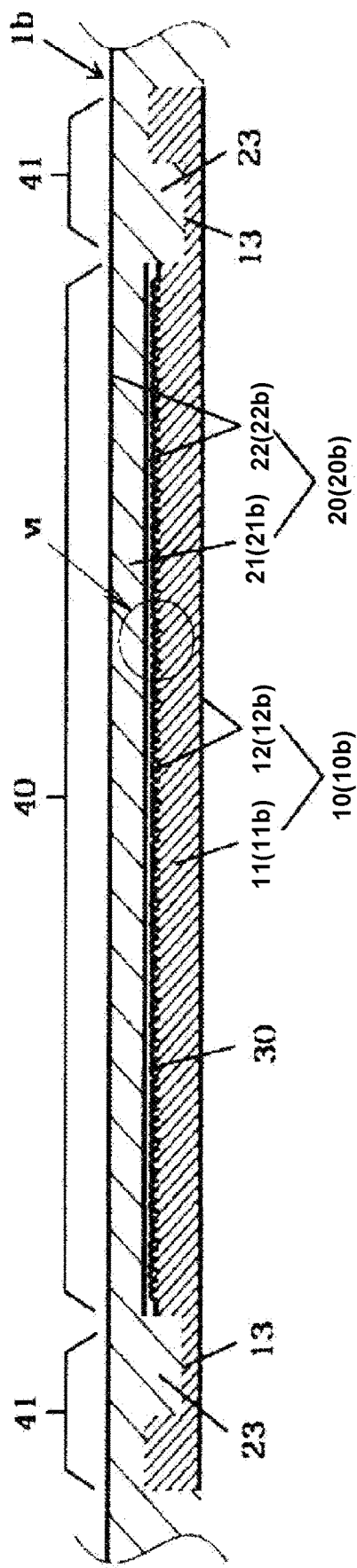
FIG. 5 is a partial cross-sectional view of a sound-absorbing cover according to a third embodiment of the disclosure.

In the third embodiment, the sound-absorbing cover 1 according to the first embodiment is further provided with multiple protrusions 15 on the first sound-absorbing layer 10 or the second sound-absorbing layer 20. The configuration of the sound-absorbing cover 1b of the third embodiment will be described with reference to FIGS. 5 and 6. The same reference numerals as those of the first embodiment are used for the same components as those of the first embodiment.

The first skin layer 12 of the first sound-absorbing layer 10 has multiple protrusions 15, 15 . . . protruding toward the second sound-absorbing layer 20. The multiple protrusions 15, 15 . . . are integrally molded with the first skin layer 12.

Figure 6:
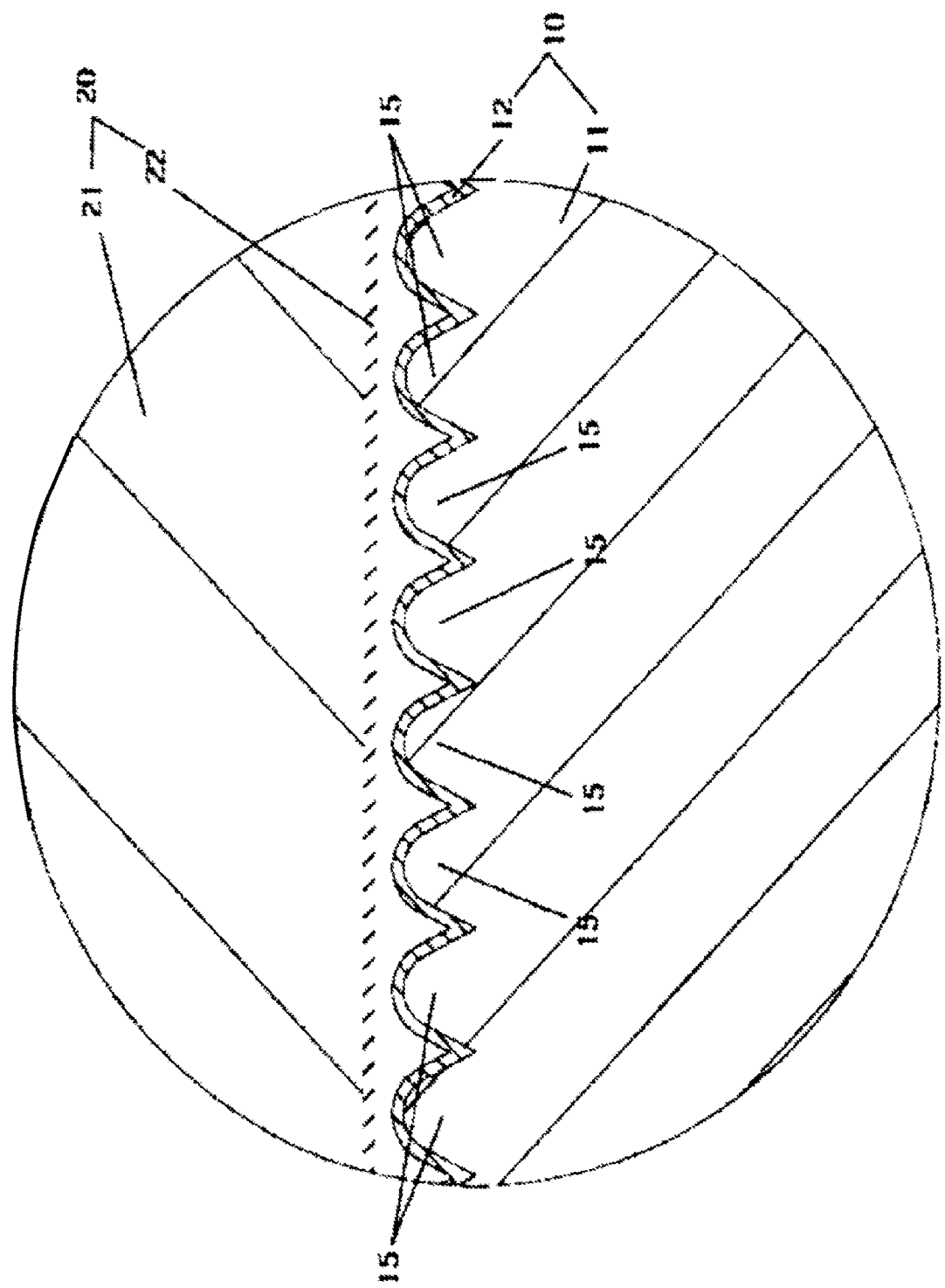
FIG. 6 is a partially enlarged view of a sound-absorbing cover according to the third embodiment of the disclosure.

In this embodiment, as shown in FIG. 6, conical protrusions 15 having a rounded tip are continuously formed.

Since the shape of the protrusion 15 is integrally molded when the first sound-absorbing layer 10 is foamed, the protrusion 15 may have any shape as long as it protrudes to the second skin layer 22 side of the second sound-absorbing layer 20 which is disposed to face each other, including an irregular shape. Further, the adjacent protrusions 15 may be provided at any intervals.

The air layer 30 is formed by integrating the first sound-absorbing layer 10 and the second sound-absorbing layer 20 as in the first embodiment. At this time, as shown in FIG. 6, multiple protrusions 15, 15 . . . of the first skin layer 12 are disposed in the gap formed between the facing surfaces of the first skin layer 12 of the first sound-absorbing layer 10 and the second skin layer 22 of the second sound-absorbing layer 20.

In this embodiment, the protruding height of each protrusion 15 is slightly smaller than the length between the facing surfaces of the first skin layer 12 of the first sound-absorbing layer 10 and the second skin layer 22 of the second sound-absorbing layer 20, and each protrusion 15 is disposed with a slight gap between the tip of each protrusion 15 and the second skin layer 22 of the second sound-absorbing layer 20. According to this configuration, the air layer 30 is formed between the adjacent protrusions 15 and the gap between each protrusion 15 and the second skin layer 22.

By providing the first skin layer 12 of the first sound-absorbing layer 10 with multiple protrusions 15, 15, . . . , the sound transmitted through the first skin layer 12 is diffused, and the sound-absorbing area of the sound is increased, which may enhance the sound absorption effect.

In this embodiment, the protrusions 15 are provided on the first skin layer 12 of the first sound-absorbing layer 10, but the protrusions may be provided on the second skin layer 22 of the second sound-absorbing layer 20, and the protrusions may be provided on both the first skin layer 12 and the second skin layer 22. Further, the tip of each protrusion 15 of the first skin layer 12 may be disposed to be in contact with the second skin layer 22 of the second sound-absorbing layer 20.

Fourth Embodiment

In the fourth embodiment, the sound-absorbing cover 1 according to the first embodiment does not include the first recessed engaging part in the first sound-absorbing layer 10 and the first protruding engaging part in the second sound-absorbing layer 20. The configuration of the sound-absorbing cover 1c of the fourth embodiment will be described with reference to FIG. 7. The same reference numerals as those of the first embodiment are used for the same components as those of the first embodiment.

Figure 7:
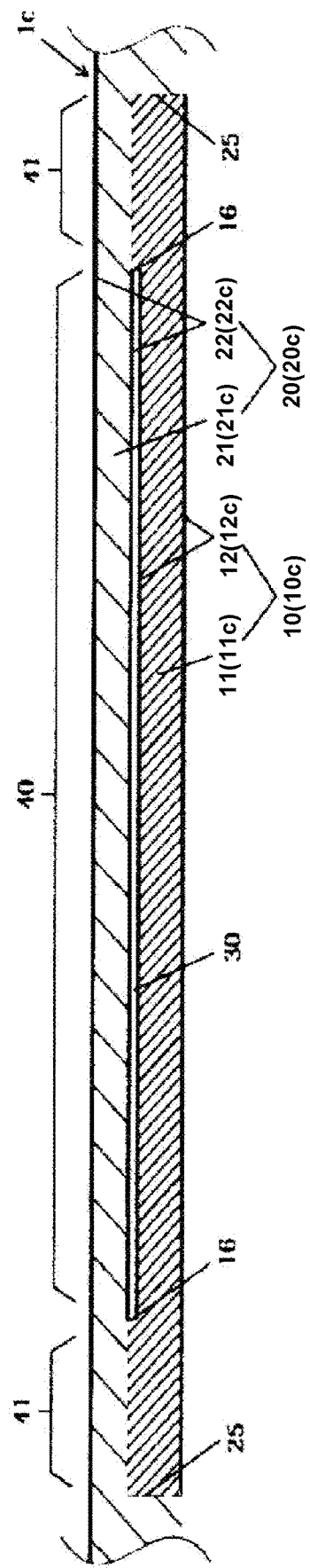
FIG. 7 is a partial cross-sectional view of a sound-absorbing cover according to a fourth embodiment of the disclosure.

The first sound-absorbing layer 10 is a plate-shaped member having a rectangular shape in a plan view. As shown in FIG. 7, the first sound-absorbing layer 10 includes a first recess 16 that opens from the inner edge of the second region 41 (outer edge of the first region 40) to the second sound-absorbing layer 20 side.

In this embodiment, the first recess 16 is a rectangular recess in a plan view. As shown in FIG. 7, in the cross-sectional view of the first sound-absorbing layer 10 in the thickness direction, the upper surface of the second region 41 of the first sound-absorbing layer 10 is disposed closer to the second sound-absorbing layer 20 side than the upper surface of the first region 40 (the bottom surface of the first recess 16) due to the first recess 16. The first skin layer 12 is formed on the bottom surface of the first recess 16.

As shown in FIG. 7, the second sound-absorbing layer 20 includes a second recess 25 that opens from the outer edge of the second region 41, which is a plate-shaped part, to the first sound-absorbing layer 10 side in a cross-sectional view of the second sound-absorbing layer 20 in the thickness direction. In this embodiment, the second recess 25 is a rectangular recess in a plan view corresponding to the outer shape of the first sound-absorbing layer 10. Further, the recess depth of the second recess 25 is substantially the same as the thickness of the first sound-absorbing layer 10.

In the second sound-absorbing layer 20, the second skin layer 22 is formed in a region corresponding to the first region 40 on the bottom surface of the second recess 25. The second skin layer 22 may be formed on the entire bottom surface of the second recess 25, or may be provided at least on a surface facing the first skin layer 12 of the first sound-absorbing layer 10.

The air layer 30 is formed by integrating the first sound-absorbing layer 10 and the second sound-absorbing layer 20. Specifically, when the first sound-absorbing layer 10 is accommodated in the second recess 25 of the second sound-absorbing layer 20, since the thickness of the first region 40 of the first sound-absorbing layer 10 is smaller than the thickness of the second region 41, as shown in FIG. 7, a gap is formed between the facing surfaces of the first skin layer 12 of the first sound-absorbing layer 10 and the second skin layer 22 of the second sound-absorbing layer 20, and this gap serves as the air layer 30.

In this embodiment, the outer shape of the first sound-absorbing layer 10 is slightly smaller than the inner shape of the second recess 25 of the second sound-absorbing layer 20, and the hardness of the second sound-absorbing layer 20 is made larger than the hardness of the first sound-absorbing layer 10; therefore, the first sound-absorbing layer 10 is press-fitted into the second recess 25 of the second sound-absorbing layer 20 and accommodated, the first sound-absorbing layer 10 and the second sound-absorbing layer 20 are integrated in a state that does not hinder handling.

The outer surface of the first sound-absorbing layer 10 and the inner surface of the second recess 25 of the second sound-absorbing layer 20 may be fixed with an adhesive, double-sided tape, or the like, and other fixing methods, such as fusing the first skin layer 12 of the first sound-absorbing layer 10 and the second skin layer 22 of the second sound-absorbing layer 20 except for the facing surfaces, may also be employed. Further, protrusions may be provided on the first skin layer 12 of the first sound-absorbing layer 10 or the second skin layer 22 of the second sound-absorbing layer 20, as in the third embodiment.

Fifth Embodiment

In the fifth embodiment, the sound-absorbing cover 1a according to the second embodiment does not include the first recessed engaging part in the first sound-absorbing layer 10 and the first protruding engaging part in the second sound-absorbing layer 20. The configuration of the sound-absorbing cover 1d of the fifth embodiment will be described with reference to FIG. 8. The same reference numerals as those of the second embodiment are used for the same components as those of the second embodiment.

The first sound-absorbing layer 10 is a plate-shaped member having a rectangular shape in a plan view. The surface of the first sound-absorbing layer 10 facing the second sound-absorbing layer 20 is a flat surface extending over the third region 50 and the fourth region 51. Further, in this embodiment, the first skin layer 12 is formed on the surface facing the second sound-absorbing layer 20 in the third region 50. The first skin layer 12 may be formed on the entire surface of the surface facing the second sound-absorbing layer 20 including the fourth region.

Figure 8:
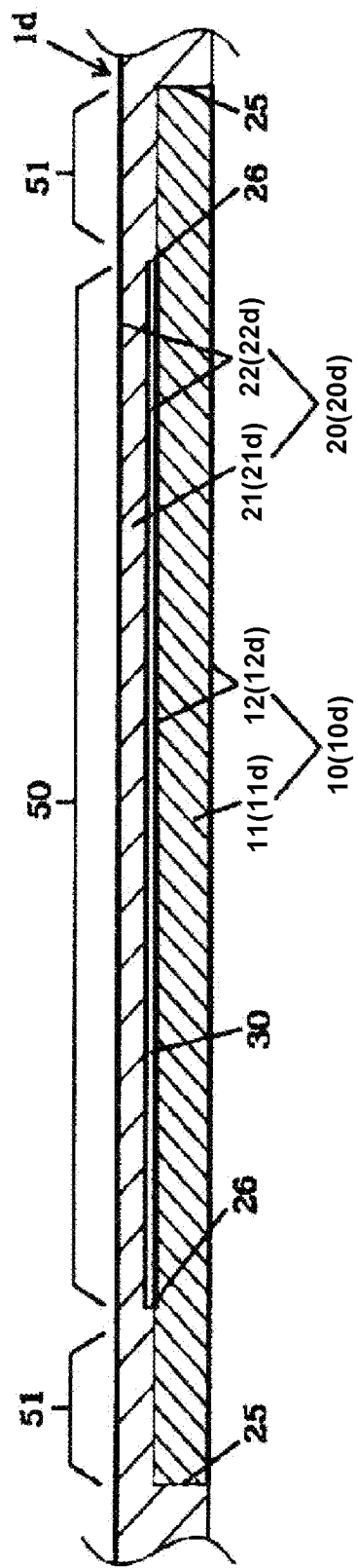
FIG. 8 is a partial cross-sectional view of a sound-absorbing cover according to the fourth embodiment of the disclosure.

As shown in FIG. 8, the second sound-absorbing layer 20 includes a second recess 25 that opens from the outer edge of the fourth region 51, which is a plate-shaped part, to the first sound-absorbing layer 10 side in a cross-sectional view of the second sound-absorbing layer 20 in the thickness direction. In this embodiment, the second recess 25 is a rectangular recess in a plan view corresponding to the outer shape of the first sound-absorbing layer 10. Further, the recess depth of the second recess 25 is substantially the same as the thickness of the first sound-absorbing layer 10.

On the bottom surface of the second recess 25, a third recess 26 that opens from the inner edge of the fourth region 51 (outer edge of the first region 50) to the first sound-absorbing layer 10 side is formed. In this embodiment, the third recess 26 is a rectangular recess in a plan view.

As shown in FIG. 8, in the second sound-absorbing layer 20, the lower surface of the fourth region 51 is disposed closer to the first sound-absorbing layer 10 side than the lower surface of the third region 50 (the bottom surface of the third recess 26) in the cross-sectional view of the second sound-absorbing layer 20 in the thickness direction. The second skin layer 22 is formed on the bottom surface of the third recess 26 disposed in the third region 50.

The air layer 30 is formed by integrating the first sound-absorbing layer 10 and the second sound-absorbing layer 20. Specifically, when the first sound-absorbing layer 10 is accommodated in the second recess 25 of the second sound-absorbing layer 20, since the thickness of the third region 50 of the second sound-absorbing layer 10 is smaller than the thickness of the fourth region 51, as shown in FIG. 8, a gap is formed between the facing surfaces of the first skin layer 12 of the first sound-absorbing layer 10 and the second skin layer 22 of the second sound-absorbing layer 20, and this gap serves as the air layer 30.

In this embodiment, the outer shape of the first sound-absorbing layer 10 is slightly smaller than the inner shape of the second recess 25 of the second sound-absorbing layer 20, and the hardness of the second sound-absorbing layer 20 is made larger than the hardness of the first sound-absorbing layer 10; therefore, the first sound-absorbing layer 10 is press-fitted into the second recess 25 of the second sound-absorbing layer 20 and accommodated, and the first sound-absorbing layer 10 and the second sound-absorbing layer 20 are integrated in a state that does not hinder handling.

The outer surface of the first sound-absorbing layer 10 and the inner surface of the second recess 25 of the second sound-absorbing layer 20 may be accommodated by using an adhesive, double-sided tape, or the like, and other fixing methods, such as fusing the first skin layer 12 of the first sound-absorbing layer 10 and the second skin layer 22 of the second sound-absorbing layer 20 except for the facing surfaces, may also be employed. Further, protrusions may be provided on the first skin layer 12 of the first sound-absorbing layer 10 or the second skin layer 22 of the second sound-absorbing layer 20, as in the third embodiment.

Other Embodiments

In the first to third embodiments described above, one of the first sound-absorbing layer 10 and the second sound-absorbing layer 20 is provided with a protruding engaging part, while the other is provided with a recessed engaging part, and the first sound-absorbing layer 10 and the second sound-absorbing layer 20 are integrated by these engagements; however, the engaging method is not limited to the above embodiment. For example, it may be configured that both the first sound-absorbing layer 10 and the second sound-absorbing layer 20 are provided with engaging recesses, and that a separate engaging member is press-fitted into each of the engaging recesses through a spacer or the like that maintains a predetermined gap between the first sound-absorbing layer 10 and the second sound-absorbing layer 20 for engagement. In addition, known engagement methods such as heat welding and engagement using an adhesive, double-sided tape, a clip, or the like may also be adopted.

<Configuration of Sound-Absorbing Layer>

(First Sound-Absorbing Layer)

The first sound-absorbing layer 10 has a first foam layer 11 formed of urethane foam and made of urethane foam, and a first skin layer 12 integrally molded on the surface layer during foam molding. The first sound-absorbing layer 10 is not limited to urethane foam, and foamed resin such as silicone foam may be used.

The first foam layer 11 of the first sound-absorbing layer 10 in the sound-absorbing cover 1 according to the first embodiment of the disclosure has a thickness of 5 mm, a density of 0.14 $g/cm^3$, a ventilation resistance of 378000 $Ns/m^4$, and an Asker-C hardness of 22 degrees.

For the ventilation resistance, a sample having a diameter of 50 mm and a thickness of 4±2 mm is cut out from the first foam layer 11 part excluding the first skin layer 12 of the first sound-absorbing layer 10, and a ventilation resistance measuring device (model number: MFR-02) manufactured by Nihon Onkyo Engineering Co., Ltd. is used to perform measurement in accordance with the direct current method (DC method) specified in ISO 9053, and the measured value is divided by the sample thickness to obtain the value of the ventilation resistance.

For the Asker-C hardness, a sample having a thickness of 5 mm of the first sound-absorbing layer 10 (including the first skin layer 12 on both sides) is used, and a rubber hardness tester (model number: Asker rubber hardness tester C type) manufactured by Kobunshi Keiki Co., Ltd. is used, and a numerical value measured in accordance with JIS K 7312 is obtained as the Asker-C hardness.

For the density, a sample having a diameter of 50 mm and a thickness of 5 mm is cut out from the first sound-absorbing layer 10 (including the first skin layer 12 on both sides), and the mass is measured with a scale (model number: TX3202N) manufactured by Shimadzu Corporation, and a value divided by the sample volume is obtained as the density.

The first foam layer 11 of the first sound-absorbing layer 10 may be set to have a thickness of 3 to 30 mm, a density of 0.06 to 0.2 $g/cm^3$, a ventilation resistance of 1000 to 1000000 $Ns/m^4$, and an Asker-C hardness of 5 to 40 degrees, depending on the properties, shape, and disposition space of the noise source.

Preferably, from the viewpoint of effectively absorbing the noise on the low frequency side in a wider range, and from the viewpoint of achieving both space saving and weight reduction of the sound-absorbing cover, the thickness is set in the range of 4 to 10 mm, the density in the range of 0.10 to 0.16 $g/cm^3$, and the ventilation resistance in the range of 100000 to 1000000 $Ns/m^4$. Further, from the viewpoint of preventing sound leakage by adhering to a noise source having undulations on the surface and reducing secondary radiated sound from the surface of the sound-absorbing cover due to vibration transmission from the noise source accompanied by vibration, the Asker-C hardness is preferably 10 to 30 degrees.

The first skin layer 12 of the first sound-absorbing layer 10 in the sound-absorbing cover 1 according to the first embodiment of the disclosure has a thickness of 10 μm, a ventilation resistance of 505000 Ns/m$^4$, and an Asker-C hardness of 22 degrees.

For the ventilation resistance, a sample having a diameter of 50 mm and a thickness of 2±1 mm is cut out from the surface layer side including the first skin layer 12 on one side of the first sound-absorbing layer 10 (including the first skin layer 12 on both sides), and from the side of the first skin layer 12 on one side, a ventilation resistance measuring device (model number: MFR-02) manufactured by Nihon Onkyo Engineering Co., Ltd. is used to perform measurement in accordance with the direct current method (DC method) specified in ISO 9053, and the measured value is divided by the sample thickness to obtain the value of the ventilation resistance.

For the Asker-C hardness, a sample having a thickness of 5 mm of the first sound-absorbing layer 10 (including the first skin layer 12 on both sides) is used, and from the side of the first skin layer 12 on one side, a rubber hardness tester (model number: Asker rubber hardness tester C type) manufactured by Kobunshi Keiki Co., Ltd. is used, and a value measured in accordance with JIS K 7312 is obtained as the Asker-C hardness.

The first skin layer 12 of the first sound-absorbing layer 10 may be set to have a thickness of 3 to 100 μm, a ventilation resistance of 1000 to 10000000 Ns/m$^4$, and an Asker-C hardness of 5 to 40 degrees, depending on the frequency properties of the noise source.

Preferably, the Asker-C hardness is set in the range of 10 to 30 degrees and the ventilation resistance is set in the range of 100000 to 1000000 Ns/m$^4$ from the viewpoint of effectively absorbing the noise in the low frequency band of 1000 Hz or less.

(Second Sound-Absorbing Layer)

The second sound-absorbing layer 20 has a second foam layer 21 formed of urethane foam and made of urethane foam, and a second skin layer 22 integrally molded on the surface layer during foam molding. The second sound-absorbing layer 20 is not limited to urethane foam, and foamed resin such as silicone foam may be used.

The second foam layer 21 of the second sound-absorbing layer 20 in the sound-absorbing cover 1 according to the first embodiment of the disclosure has a thickness of 5 mm, a density of 0.12 g/cm$^3$, a ventilation resistance of 153000 Ns/m$^4$, and an Asker-C hardness of 76 degrees.

For the ventilation resistance, a sample having a diameter of 50 mm and a thickness of 4±2 mm is cut out from the second foam layer 21 part excluding the second skin layer 22 of the second sound-absorbing layer 20, and a ventilation resistance measuring device (model number: MFR-02) manufactured by Nihon Onkyo Engineering Co., Ltd. is used to perform measurement in accordance with the direct current method (DC method) specified in ISO 9053, and the measured value is divided by the sample thickness to obtain the value of the ventilation resistance.

For the Asker-C hardness, a sample having a thickness of 5 mm of the second sound-absorbing layer 20 (including the second skin layer 22 on both sides) is used, and a rubber hardness tester (model number: Asker rubber hardness tester C type) manufactured by Kobunshi Keiki Co., Ltd. is used, and a numerical value measured in accordance with JIS K 7312 is obtained as the Asker-C hardness.

For the density, a sample having a diameter of 50 mm and a thickness of 5 mm is cut out from the second sound-absorbing layer 20 (including the first skin layer 22 on both sides), and the mass is measured with a scale (model number: TX3202N) manufactured by Shimadzu Corporation, and a value divided by the sample volume is obtained as the density.

The second foam layer 21 of the second sound-absorbing layer 20 may be set to have a thickness of 3 to 30 mm, a density of 0.06 to 0.2 g/cm$^3$, a ventilation resistance of 1000 to 1000000 Ns/m$^4$, and an Asker-C hardness of 40 to 95 degrees, depending on the properties, shape, and disposition space of the noise source.

Preferably, from the viewpoint of effectively absorbing the noise on the low frequency side in a wider range, and from the viewpoint of achieving both space saving and weight reduction of the sound-absorbing cover, the thickness is set in the range of 4 to 10 mm, the density in the range of 0.10 to 0.16 g/cm$^3$, and the ventilation resistance in the range of 100000 to 1000000 Ns/m$^4$. Further, from the viewpoint of facilitating the fixing of the sound-absorbing cover to the target object, it is preferable that the Asker-C hardness is 60 to 90 degrees.

The second skin layer 22 of the second sound-absorbing layer 20 in the sound-absorbing cover 1 according to the first embodiment of the disclosure has a thickness of 10 μm and a ventilation resistance of 584000 Ns/m 4.

For the ventilation resistance, a sample having a diameter of 50 mm and a thickness of 2±1 mm is cut out from the surface layer side including the second skin layer 22 on one side of the second sound-absorbing layer 20 (including the second skin layer 22 on both sides), and from the side of the second skin layer 22 on one side, a ventilation resistance measuring device (model number: MFR-02) manufactured by Nihon Onkyo Engineering Co., Ltd. is used to perform measurement in accordance with the direct current method (DC method) specified in ISO 9053, and the measured value is divided by the sample thickness to obtain the value of the ventilation resistance.

For the Asker-C hardness, a sample having a thickness of 5 mm of the second sound-absorbing layer 20 (including the second skin layer 22 on both sides) is used, and from the side of the second skin layer 22 on one side, a rubber hardness tester (model number: Asker rubber hardness tester C type) manufactured by Kobunshi Keiki Co., Ltd. is used, and a value measured in accordance with JIS K 7312 is obtained as the Asker-C hardness.

The second skin layer 22 of the second sound-absorbing layer 20 may be set to have a thickness of 3 to 100 μm, a ventilation resistance of 1000 to 1000000 Ns/m$^4$, and an Asker-C hardness of 40 to 95 degrees, depending on the frequency properties of the noise source.

Preferably, the Asker-C hardness is set in the range of 60 to 90 degrees and the ventilation resistance is set in the range of 100000 to 1000000 Ns/m$^4$ from the viewpoint of effectively absorbing the noise in the low frequency band of 1000 Hz or less.

From the viewpoint of expanding the range of absorption frequencies in the low frequency band by the film vibration type sound-absorbing structure described later, it is effective to make the properties of the first skin layer 12 of the first sound-absorbing layer 10 different from the properties of the second skin layer 22 of the second sound-absorbing layer 20; in particular, it is preferable to set the hardness of the first skin layer 12 of the first sound-absorbing layer 10 to 5 to 40 degrees and the hardness of the second skin layer 22 of the second sound-absorbing layer 20 to 40 to 95 degrees according to the measurement method described above. Further, it is more preferable to set the hardness of the first skin layer 12 of the first sound-absorbing layer 10 to 10 to 30 degrees and the hardness of the second skin layer 22 of the second sound-absorbing layer 20 to 60 to 95 degrees according to the measurement method described above. In addition, according to the required usage conditions, the first sound-absorbing layer 10 may be a sound-absorbing layer having the above-mentioned properties of the second sound-absorbing layer 20, and the second sound-absorbing layer 20 may be a sound-absorbing layer having the above-mentioned properties of the first sound-absorbing layer 10.

<Manufacturing Method of Sound-Absorbing Cover>

In order to manufacture the sound-absorbing cover 1 of the disclosure, foam molding may be performed twice. First, a first foam body (first sound-absorbing layer 10) configured by the first foam layer 11 and the first skin layer 12 is formed. A mold release agent is applied to the inner surface of the upper mold and the inner surface of the lower mold of the molding die. Next, the upper mold and the lower mold are clamped, and the urethane foam resin raw material is injected into the first cavity formed by the inner surface of the upper mold and the inner surface of the lower mold to perform foam molding. At this time, the preferable temperature of the upper mold in which the first skin layer 12 is formed is 40 to 60° C. Further, a wax-based mold release agent is preferably used, but the type is not limited.

Next, a second foam body (second sound-absorbing layer 20) configured by the second foam layer 21 and the second skin layer 22 is formed. Similarly, a mold release agent is applied to the inner surface of the upper mold and the inner surface of the lower mold of the molding die. Next, the upper mold and the lower mold are clamped, and the urethane foam resin raw material is injected into the first cavity formed by the inner surface of the upper mold and the inner surface of the lower mold to perform foam molding. At this time, the preferable temperature of the upper mold in which the second skin layer 22 is formed is 40 to 60° C. Further, a wax-based mold release agent is preferably used, but the type is not limited.

When multiple protrusions 15 are formed on the surface layer of the first skin layer 12 of the first sound-absorbing layer 10 or the second skin layer 22 of the second sound-absorbing layer 20, a mold having multiple recesses formed on the inner surface is used as the upper mold.

<Action and Effect of Sound-Absorbing Cover>

The action and effect of the sound-absorbing cover 1 of this embodiment will be described. In the sound-absorbing cover 1 of the disclosure, the first sound-absorbing layer 10 and the second sound-absorbing layer 20 are layered with the first skin layer 12 of the first sound-absorbing layer 10 and the second skin layer 22 of the second sound-absorbing layer 20 facing each other, and the air layer 30 is provided between the facing surfaces of the first skin layer 12 of the first sound-absorbing layer 10 and the second skin layer 22 of the second sound-absorbing layer 20. Here, the first sound-absorbing layer 10 and the second sound-absorbing layer 20 will be described as a configuration in which the first skin layer 12 and the second skin layer 22 are not provided on the non-facing surfaces, respectively.

When the first sound-absorbing layer 10 is disposed on the noise source side, the sound generated from the noise source is first diffused inside the first foam layer 11 and converted into heat energy. Next, the sound transmitted through the first foam layer 11 is emitted through the first skin layer 12. At this time, a first film vibration type sound-absorbing structure is configured by the first skin vibration layer 12 and the air layer 30. Since multiple fine cells of the first foam layer 11 are closed by the first skin layer 12 and the rigidity of the individual cell membranes configured by the first skin layer 12 is small, the natural frequency is set to be small, and low-frequency sounds are effectively absorbed.

Further, the sound transmitted through the air layer 30 is emitted through the second skin layer 22 of the second sound-absorbing layer 20. Multiple fine cells of the second foam layer 21 are closed by the second skin layer 22, and a second film vibration type sound-absorbing structure is configured by the cell membranes formed by the second skin layer 22 and the air in the cell. Similarly, since the rigidity of the individual cell membranes is small, the natural vibration is set to be small, and low-frequency sounds are effectively absorbed. Further, the sound transmitted through the second skin layer 22 is diffused inside the second foam layer 21 and converted into heat energy.

Here, since the rigidity of the first skin layer 12 and the rigidity of the second skin layer 22 are different, the natural frequency of the first film vibration type sound-absorbing structure and the natural frequency of the second film vibration type sound-absorbing structure are in different ranges, and a wider band of low-frequency sounds may be absorbed.

Further, since the rigidity of the first skin layer 12 of the first sound-absorbing layer 10 disposed on the noise source side is made smaller than the rigidity of the second skin layer 22 of the second sound-absorbing layer 20 disposed on the opposite side of the sound source side, the sound having a low frequency may be absorbed from the first skin layer 12 toward the second skin layer 22 side.

In particular, the Asker-C hardness of the first skin layer 12 of the first sound-absorbing layer 10 is set to 5 to 40 degrees, and the Asker-C hardness of the second skin layer of the second sound-absorbing layer 20 is set to 40 to 95 degrees according to the above-mentioned measurement method, and by setting the Asker-C hardness of each to different values, noise in the low frequency band of 630 to 1000 Hz may be effectively absorbed.

When the first sound-absorbing layer 10 and the second sound-absorbing layer 20 are provided with the first skin layer 12 and the second skin layer 22 on the non-facing surfaces of the first sound-absorbing layer 10 and the second sound-absorbing layer 20, respectively, due to the film vibration type sound-absorbing structure by the first skin layer 12 on the non-facing surface side of the first sound-absorbing layer 10 and the film vibration type sound-absorbing structure by the second skin layer 22 on the non-facing surface side of the second sound-absorbing layer 20, similar to the above, the effect of absorbing low-frequency sounds is exhibited.

<Evaluation Result of Sound-Absorbing Cover>

The effects of the disclosure will be described with reference to examples.

Example 1

60 parts by weight of a polyol raw material was prepared by mixing a polyether polyol for flexible polyurethane (number of functional groups being 3, molecular weight being 6000), a cross-linking agent, water as a foaming agent, a catalyst, and a foam stabilizer, and then it was mixed with 40 parts by weight of a polyisocyanate raw material to obtain a urethane foam resin raw material. Next, after applying a wax-based mold release agent to the inner surfaces of the upper and lower molds of the molding die, the upper and lower molds were clamped, and the upper and lower molds were held at 50° C. The urethane foam resin raw material was injected into the cavity of the molding die to perform foam molding, and a first sound-absorbing layer 10a having a first foam layer 11a and a first skin layer 12a was molded. After the completion of foam molding, the mold was released to obtain a rectangular plate-shaped sample having a length of 500 mm, a width of 600 mm, and a thickness of 5 mm. After the mold release, needle processing was performed to adjust the ventilation resistance. A predetermined protrusion was provided in the upper mold, and a predetermined recessed engaging part was formed on the first sound-absorbing layer 10.

The first foam layer 11a of this sample has a density of 0.14 g/cm$^3$, an Asker-C hardness of 22 degrees, and a ventilation resistance of 378000 Ns/m$^4$. The ventilation resistance on the surface layer side including the first skin layer 12a is 505000 Ns/m$^4$.

Next, after applying a wax-based mold release agent to the inner surfaces of the upper and lower molds of the molding die, the upper and lower molds were clamped, and the upper and lower molds were held at 50° C. The urethane foam resin raw material was injected into the cavity of the molding die to perform foam molding, and a second sound-absorbing layer 20a having a second foam layer 21a and a second skin layer 22a was molded. A polyol raw material was prepared by mixing a polyether polyol for flexible polyurethane (number of functional groups being 3, molecular weight being 6000), a cross-linking agent, water as a foaming agent, a catalyst, and a foam stabilizer, and then 51 parts by weight of the polyol raw material was mixed with 49 parts by weight of a polyisocyanate raw material to obtain a urethane foam resin raw material for the second sound-absorbing layer. Further, in order to make the hardness higher than that of the first sound-absorbing layer, a polyol raw material was used in which the polyether polyol (number of functional groups being 3, molecular weight being 6000) used for the first sound-absorbing layer and a low-molecular-weight polyether polyol (functional group number being 2, molecular weight being 400) were mixed at a ratio of 70:30 parts by weight. After the completion of molding, the mold was released to obtain a rectangular plate-shaped sample having a length of 500 mm, a width of 600 mm, and a thickness of 5 mm. After the mold release, needle processing was performed to adjust the ventilation resistance. A predetermined recess was provided in the lower mold, and a predetermined protruding engaging part was formed on the second sound-absorbing layer 20.

The hardness of the second sound-absorbing layer may be adjusted by adjusting the mixing ratio of the polyether polyol and the low-molecular-weight polyether polyol. Further, when the urethane foam moldability is deteriorated by mixing the low-molecular-weight polyether polyol, it may be adjusted by the amount of the cross-linking agent added.

The second foam layer 21a of this sample has a density of 0.12 g/cm$^3$, an Asker-C hardness of 76 degrees, and a ventilation resistance of 153000 Ns/m$^4$. The ventilation resistance on the surface layer side including the second skin layer 22a is 584000 Ns/m$^4$.

Next, the recessed engaging part of the first sound-absorbing layer 10 and the protruding engaging part of the second sound-absorbing layer 20 were engaged, and the first sound-absorbing layer 10 was disposed below the second sound-absorbing layer 20 as in the first embodiment, and a gap of 0.1 mm was formed between the facing surfaces of the first skin layer 12 and the second skin layer 22 to form the air layer 30.

Example 2

The first sound-absorbing layer 10a and the second sound-absorbing layer 20a were molded by the same method as in Example 1, and the second sound-absorbing layer 20 was disposed below the first sound-absorbing layer 10. That is, the first sound-absorbing layer 10 and the second sound-absorbing layer 20 in Example 1 were interchanged and disposed.

Example 3

A first sound-absorbing layer 10b and a second sound-absorbing layer 20b were molded by the same method as in Example 1 except for the input amount of the urethane foam resin raw material, and the first sound-absorbing layer 10b was disposed below the second sound-absorbing layer 20b, and a gap of 0.1 mm was formed between the facing surfaces of the first skin layer 12b and the second skin layer 22b to form the air layer 30. Specifically, for the first sound-absorbing layer 10b, the same raw material as the urethane foam resin raw material of the first sound-absorbing layer 10a of Example 1 was used, and when the input amount of the urethane foam resin raw material of Example 1 was used as the reference input amount, 1.14 times the reference input amount of urethane foam resin raw material was input and molded. Further, for the second sound-absorbing layer 20b, when the input amount of the urethane foam resin raw material of the second sound-absorbing layer 20a of Example 1 was used as the reference input amount, 0.83 times the reference input amount of urethane foam resin raw material was input and molded.

The first foam layer 11b of this sample has a density of 0.16 g/cm$^3$, an Asker-C hardness of 38 degrees, and a ventilation resistance of 639794 Ns/m$^4$. The ventilation resistance on the surface layer side including the first skin layer 12b is 130850 Ns/m$^4$. Further, the second foam layer 21b has a density of 0.1 g/cm$^3$, an Asker-C hardness of 59 degrees, and a ventilation resistance of 103000 Ns/m$^4$. Further, the ventilation resistance on the surface layer side including the second skin layer 22b is 379148 Ns/m$^4$.

Example 4

The first sound-absorbing layer 10b and the second sound-absorbing layer 20b were molded by the same method as in Example 3, and the second sound-absorbing layer 20b was disposed below the first sound-absorbing layer 10b. That is, the first sound-absorbing layer 10b and the second sound-absorbing layer 20b in Example 3 were interchanged and disposed.

Example 5

A first sound-absorbing layer 10c and a second sound-absorbing layer 20c were molded by the same method as in Example 1 except for the input amount and the compounding ratio of the urethane foam resin raw material, and the first sound-absorbing layer 10c was disposed below the second sound-absorbing layer 20c, and a gap of 0.1 mm was formed between the facing surfaces of the first skin layer 12c and the second skin layer 22c to form the air layer 30. Specifically, for the first sound-absorbing layer 10c, the same raw material as the urethane foam resin raw material of the first sound-absorbing layer 10a of Example 1 was used, and when the input amount of the urethane foam resin raw material of the first sound-absorbing layer of Example 1 was used as the reference input amount, 0.85 times the reference input amount of urethane foam resin raw material was input and molded. Further, the second sound-absorbing layer 20c was molded with 54 parts by weight of the polyol raw material and 46 parts by weight of the polyisocyanate raw material.

The first foam layer 11c of this sample has a density of 0.12 g/cm$^3$, an Asker-C hardness of 23 degrees, and a ventilation resistance of 201098 Ns/m$^4$. The ventilation resistance on the surface layer side including the first skin layer 12c is 438441 Ns/m$^4$. Further, the second foam layer 21c has a density of 0.12 g/cm$^3$, an Asker-C hardness of 63 degrees, and a ventilation resistance of 148209 Ns/m$^4$. Further, the ventilation resistance on the surface layer side including the second skin layer 22c is 713111 Ns/m$^4$.

Example 6

The first sound-absorbing layer 10c and the second sound-absorbing layer 20c were molded by the same method as in Example 5, and the second sound-absorbing layer 20c was disposed below the first sound-absorbing layer 10c. That is, the first sound-absorbing layer 10c and the second sound-absorbing layer 20c in Example 5 were interchanged and disposed.

Example 7

A first sound-absorbing layer 10d and a second sound-absorbing layer 20d were molded by the same method as in Example 1 except for the compounding ratio of the polyol raw material and the polyisocyanate raw material and the post-processing method, and the first sound-absorbing layer 10d was disposed below the second sound-absorbing layer 20d, and a gap of 0.1 mm was formed between the facing surfaces of the first skin layer 12d and the second skin layer 22d to form the air layer 30. Specifically, the first sound-absorbing layer 10d was molded with 63 parts by weight of the polyol raw material and 37 parts by weight of the polyisocyanate raw material. Further, the second sound-absorbing layer 20d was molded using the same raw material as the urethane foam resin raw material of the second sound-absorbing layer 20a of Example 1, and then needle-processed to adjust the air permeability.

The first foam layer 11d of this sample has a density of 0.14 g/cm$^3$, an Asker-C hardness of 21 degrees, and a ventilation resistance of 281978 Ns/m$^4$. The ventilation resistance on the surface layer side including the first skin layer 12d is 456171 Ns/m$^4$. Further, the second foam layer 21d has a density of 0.12 g/cm$^3$, an Asker-C hardness of 67 degrees, and a ventilation resistance of 715612 Ns/m$^4$. Further, the ventilation resistance on the surface layer side including the second skin layer 22d is 504229 Ns/m$^4$.

Example 8

The first sound-absorbing layer 10d and the second sound-absorbing layer 20d were molded by the same method as in Example 7, and the second sound-absorbing layer 20d was disposed below the first sound-absorbing layer 10d. That is, the first sound-absorbing layer 10 and the second sound-absorbing layer 20 in Example 7 were interchanged and disposed.

Comparative Example 1

The first sound-absorbing layer 10a and the second sound-absorbing layer 20a were molded by the same method as in Example 1, and an adhesive was applied to the entire surfaces of the first skin layer 12a and the second skin layer 22a to bond them.
(Evaluation Method)

For the samples of Examples 1 to 8 and Comparative Example 1, the sound absorption coefficient was measured by a method based on the reverberation room method sound absorption coefficient measurement method of JIS A 1409. Further, the surface opposite to the sound source was grounded to a rigid floor for measurement.

In Examples 1, 3, 5, and 7, the first sound-absorbing layer 10 was disposed on the sound source side, and in Examples 2, 4, 6, and 8, the second sound-absorbing layer 20 was disposed on the sound source side. Further, in Comparative Example 1, the first sound-absorbing layer 10 was disposed on the sound source side.

Figure 9:
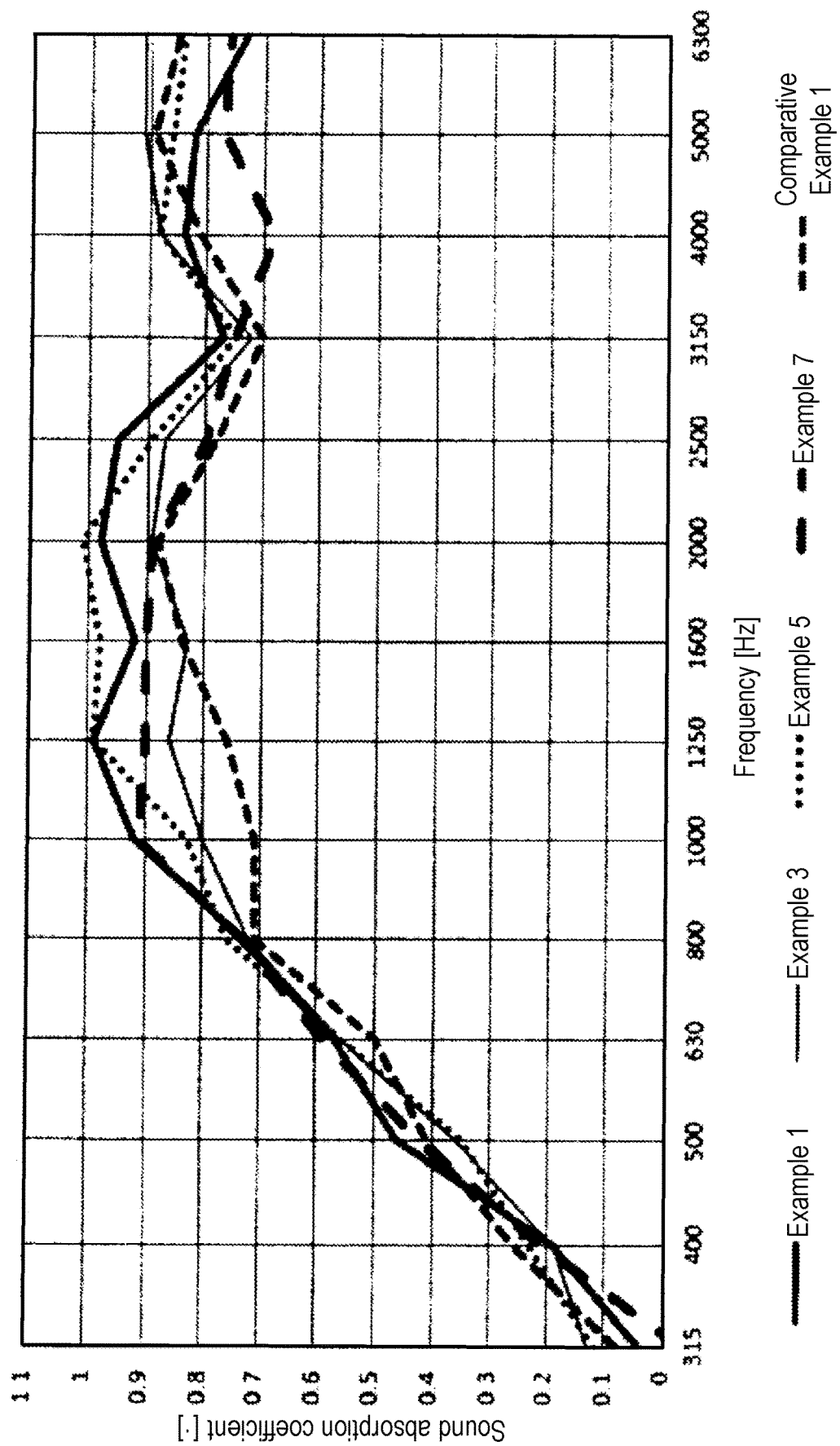
FIG. 9 is a diagram comparing the frequency-dependent performance of the sound absorption coefficient.
Figure 10:
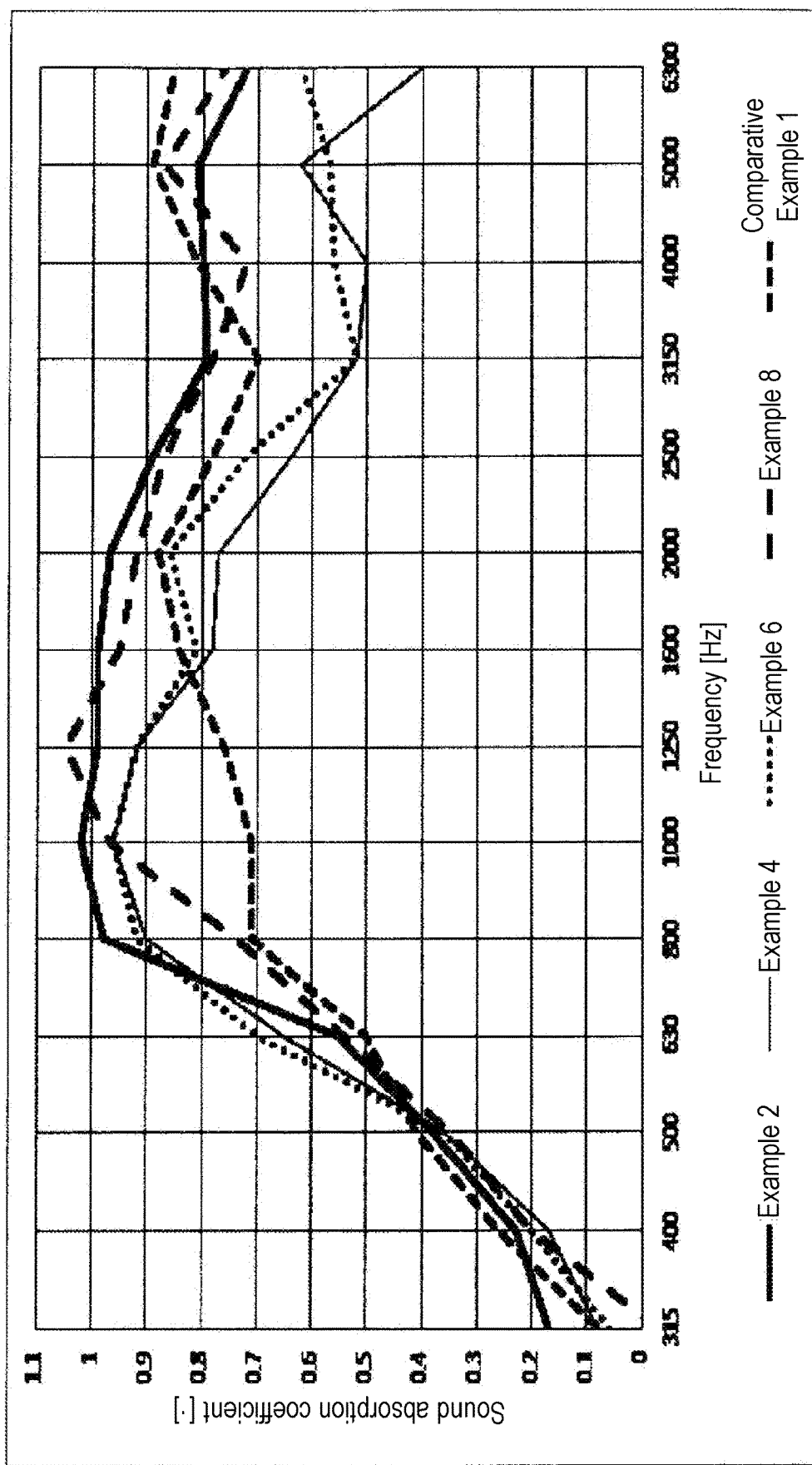
FIG. 10 is a diagram comparing the frequency-dependent performance of the sound ab sorption coefficient.

As shown in FIG. 9, it was confirmed that Examples 1, 3, 5, and 7 had a higher sound absorption coefficient in the low frequency band of 800 to 1000 Hz as compared with Comparative Example 1. Further, as shown in FIG. 10, it was confirmed that Examples 2, 4, 6, and 8 had a higher sound absorption coefficient in the low frequency band of 800 to 1000 Hz as compared with Comparative Example 1. It is presumed that the above-mentioned two film vibration type sound-absorbing structures may absorb a wider range of low-frequency noise. In addition, in Comparative Example 1, the first skin layer 12a and the second skin layer 22a were integrated to form one skin layer with relatively high rigidity, and it is presumed that this causes the frequency band on the low frequency side to become narrower by this film vibration type sound-absorbing structure. In addition, the cell membrane is clogged by the adhesive, and the ventilation resistance of the first skin layer 12a and the second skin layer 22a increases and the air permeability decreases, whereby it becomes difficult for noise to reach the second foam layer 21a of the second sound-absorbing layer 20a on the side (rigid floor side) away from the sound source, and the ratio of high-frequency components absorbed by porous sound absorption is reduced; therefore, the high frequency sound absorption coefficient is also lowered. In addition, the result of Example 3 was that the sound absorption coefficient in the low frequency band was lower than that of Examples 1, 5 and 7. The reason for this is that in Example 3, the density, hardness, and ventilation resistance of the first foam layer of the first sound-absorbing layer are higher than those of other examples, so the energy of the sound reaching the interface between the first skin layer and the second skin layer is reduced, and the sound-absorbing effect of the film vibration type sound-absorbing structure was not sufficiently exhibited.

Further, as shown in FIG. 10, it was confirmed that Examples 2, 4, 6, and 8 had a higher sound absorption coefficient in the low frequency band of 800 to 1000 Hz as compared with Comparative Example 1. Further, in Examples 2, 4, and 6, the sound absorption coefficient in the low frequency band of 630 to 1000 Hz is not higher than that in Examples 1, 3, and 5, respectively, and it was confirmed that disposing the first sound-absorbing layer 10 having the second skin layer 22 having a higher rigidity (Asker-C hardness) than the first skin layer 12 on the sound source side is more effective in terms of sound absorption coefficient. The reason for this is that, as a principle of sound absorption, the thicker the layer from the skin layer to the rigid floor disposed on the sound source side, the more the sound absorption coefficient moves to the low frequency side, and by disposing the second sound-absorbing layer (second skin layer) with a relatively higher rigidity on the sound source side, the sound absorption coefficient peak moves to the low frequency side due to the second skin layer on the sound source side, and the sound absorption coefficient around 630 Hz increased. No similar effect could be confirmed for Examples 7 and 8. The reason for this is that the ventilation resistance of the second foam layer is higher than the ventilation resistance of the first foam layer, so in Example 8, the energy of the sound reaching the interface between the first skin layer and the second skin layer is reduced, and the sound-absorbing effect of the film vibration type sound-absorbing structure was not sufficiently exhibited.

However, since the positional relationship between the first skin layer and the second skin layer, which are disposed facing each other via the air layer, from the rigid floor is almost the same, this effect does not change, and compared with Comparative Example 1, the overall sound absorption performance remains high.

Further, in Examples 1, 2, 3, 5, 7, and 8, with the first foam layer 11 of the first sound-absorbing layer 10 and the second foam layer 21 of the second sound-absorbing layer 20, noise absorption performance for medium and high frequencies exceeding 1000 Hz is exhibited, and it was confirmed that compared with Comparative Example 1, the sound absorption coefficient was higher in a wide frequency band from 630 to 5000 Hz.

What is claimed is:

1. A sound-absorbing cover comprising:
a first sound-absorbing layer having a first foam layer and a first skin layer integrally molded when the first foam layer is molded; and
a second sound-absorbing layer having a second foam layer and a second skin layer integrally molded when the second foam layer is molded,
wherein the first skin layer of the first sound-absorbing layer has a rigidity different from a rigidity of the second skin layer of the second sound-absorbing layer,
the first sound-absorbing layer and the second sound-absorbing layer are layered in a state where the first skin layer and the second skin layer face each other, and
the sound-absorbing cover further comprises an air layer between facing surfaces of the first skin layer of the first sound-absorbing layer and the second skin layer of the second sound-absorbing layer,
wherein in a region where the air layer is formed, the first skin layer and the second skin layer are spaced apart from each other, and in a peripheral region outside the region in a plane direction of the air layer, the first sound-absorbing layer and the second sound-absorbing layer are integrated in abutting contact with each other, and
wherein the first sound-absorbing layer has a ventilation resistance of 100000 to 1000000 Ns/m$^4$, and the second sound-absorbing layer has a ventilation resistance of 100000 to 1000000 Ns/m$^4$.

2. The sound-absorbing cover according to claim 1, wherein the first sound-absorbing layer is disposed on a noise source side, and the rigidity of the first skin layer of the first sound-absorbing layer is smaller than the rigidity of the second skin layer of the second sound-absorbing layer.

3. The sound-absorbing cover according to claim 1, wherein the second sound-absorbing layer is disposed on a noise source side, and the rigidity of the first skin layer of the first sound-absorbing layer is smaller than the rigidity of the second skin layer of the second sound-absorbing layer.

4. The sound-absorbing cover according to claim 1, wherein the first skin layer of the first sound-absorbing layer has a hardness that is an Asker-C hardness of 5 to 40 degrees, and the second skin layer of the second sound-absorbing layer has a hardness that is an Asker-C hardness of 40 to 95 degrees.

5. The sound-absorbing cover according to claim 2, wherein the first skin layer of the first sound-absorbing layer has a hardness that is an Asker-C hardness of 5 to 40 degrees, and the second skin layer of the second sound-absorbing layer has a hardness that is an Asker-C hardness of 40 to 95 degrees.

6. The sound-absorbing cover according to claim 3, wherein the first skin layer of the first sound-absorbing layer has a hardness that is an Asker-C hardness of 5 to 40 degrees, and the second skin layer of the second sound-absorbing layer has a hardness that is an Asker-C hardness of 40 to 95 degrees.

7. The sound-absorbing cover according to claim 1, wherein the first skin layer of the first sound-absorbing layer has a hardness that is an Asker-C hardness of 10 to 30 degrees, and the second skin layer of the second sound-absorbing layer has a hardness that is an Asker-C hardness of 60 to 90 degrees.

8. The sound-absorbing cover according to claim 2, wherein the first skin layer of the first sound-absorbing layer has a hardness that is an Asker-C hardness of 10 to 30 degrees, and the second skin layer of the second sound-absorbing layer has a hardness that is an Asker-C hardness of 60 to 90 degrees.

9. The sound-absorbing cover according to claim 3, wherein the first skin layer of the first sound-absorbing layer has a hardness that is an Asker-C hardness of 10 to 30 degrees, and the second skin layer of the second sound-absorbing layer has a hardness that is an Asker-C hardness of 60 to 90 degrees.

10. The sound-absorbing cover according to claim 1, wherein the first foam layer of the first sound-absorbing layer has a density of 0.06 to 0.2 g/cm$^3$, and the second foam layer of the second sound-absorbing layer has a density of 0.06 to 0.2 g/cm$^3$.

11. The sound-absorbing cover according to claim 2, wherein the first foam layer of the first sound-absorbing layer has a density of 0.06 to 0.2 g/cm$^3$, and the second foam layer of the second sound-absorbing layer has a density of 0.06 to 0.2 g/cm$^3$.

12. The sound-absorbing cover according to claim 3, wherein the first foam layer of the first sound-absorbing layer has a density of 0.06 to 0.2 g/cm$^3$, and the second foam layer of the second sound-absorbing layer has a density of 0.06 to 0.2 g/cm$^3$.

13. The sound-absorbing cover according to claim 4, wherein the first foam layer of the first sound-absorbing layer has a density of 0.06 to 0.2 g/cm$^3$, and the second foam layer of the second sound-absorbing layer has a density of 0.06 to 0.2 g/cm$^3$.

14. The sound-absorbing cover according to claim 1, wherein the first foam layer of the first sound-absorbing layer has a density of 0.10 to 0.16 g/cm$^3$, and the second foam layer of the second sound-absorbing layer has a density of 0.10 to 0.16 g/cm$^3$.

15. The sound-absorbing cover according to claim 1, wherein the first sound-absorbing layer comprises:
a first region in which the first skin layer is formed;
a second region that surrounds the first region and is disposed on the second sound-absorbing layer side with respect to the first region; and
a plurality of first engaging recesses that are recesses opening to the second sound-absorbing layer side in the second region and are disposed at predetermined intervals in a circumferential direction of the second region,
the second sound-absorbing layer comprises a plurality of first engaging protrusions that are engaged with the plurality of first engaging recesses of the first sound-absorbing layer, and
the air layer is a gap formed between the facing surfaces of the first skin layer of the first sound-absorbing layer and the second skin layer of the second sound-absorbing layer in a state in which the plurality of first engaging recesses of the first sound-absorbing layer and the plurality of first engaging protrusions of the second sound-absorbing layer are engaged with each other.

16. The sound-absorbing cover according to claim 1, wherein the second sound-absorbing layer comprises:
a third region in which the second skin layer is formed;
a fourth region that surrounds the third region and is disposed on the first sound-absorbing layer side with respect to the third region; and
a plurality of second engaging protrusions that are protrusions protruding to the first sound-absorbing layer side in the fourth region and are disposed at predetermined intervals in a circumferential direction surrounding the third region,
the first sound-absorbing layer comprises a plurality of second engaging recesses that are engaged with the plurality of second engaging protrusions of the second sound-absorbing layer, and
the air layer is a gap formed between the facing surfaces of the first skin layer of the first sound-absorbing layer and the second skin layer of the second sound-absorbing layer in a state in which the plurality of second engaging recesses of the first sound-absorbing layer and the plurality of second engaging protrusions of the second sound-absorbing layer are engaged with each other.

17. The sound-absorbing cover according to claim 1, wherein the first sound-absorbing layer comprises a first recess that opens to the second sound-absorbing layer side,
the first skin layer is formed on a bottom surface of the first recess,
the second sound-absorbing layer comprises a second recess that opens to the first sound-absorbing layer side,
the second skin layer is formed on a bottom surface of the second recess,
the first sound-absorbing layer has an outer shape corresponding to an inner shape of the second recess of the second sound-absorbing layer, and
the air layer is a gap formed between the facing surfaces of the first skin layer of the first sound-absorbing layer and the second skin layer of the second sound-absorbing layer in a state in which the first sound-absorbing layer is accommodated in the second recess of the second sound-absorbing layer.

18. The sound-absorbing cover according to claim 1, wherein the second sound-absorbing layer comprises:
a second recess that opens to the first sound-absorbing layer side; and
a third recess that opens to the first sound-absorbing layer side on a bottom surface of the second recess, wherein the second skin layer is formed on a bottom surface of the third recess,
the first sound-absorbing layer has an outer shape corresponding to an inner shape of the second recess of the second sound-absorbing layer, and
the air layer is a gap formed between the facing surfaces of the first skin layer of the first sound-absorbing layer and the second skin layer of the second sound-absorbing layer in a state in which the first sound-absorbing layer is accommodated in the second recess of the second sound-absorbing layer.

19. The sound-absorbing cover according to claim 1, wherein at least one of the first skin layer of the first sound-absorbing layer and the second skin layer of the second sound-absorbing layer has a plurality of protrusions protruding to the other of the first skin layer and the second skin layer disposed to face each other.

* * * * *